3,168,392
AQUEOUS AMMONIACAL SOLUTION CONTAINING A COMPLEX ARSENIC COMPOUND

Barnard C. Creech, Flossmoor, Lawrence V. Collings, Park Forest, and Paul Shapiro, Chicago, Ill., assignors to Sinclair Research, Inc., a corporation of Delaware
No Drawing. Filed Aug. 28, 1961, Ser. No. 134,155
4 Claims. (Cl. 71—59)

The present invention relates to a novel complex arsenic compound for use in reducing the corrosive tendencies of solutions of nitrogen compounds toward ferous metal surfaces.

There is a well recognized corrosion problem in industries concerned with the manufacture, storage, transportation and handling of ammoniacal solutions of nitrogen compounds, known in the trade as nitrogen solutions. In the handling of such solutions it is often necessary to transport and store them in ferrous containers such as drums, tanks and pipelines. In view of the corrrosive nature of the nitrogen solutions against ferrous metals, many manufacturers now use storage and transportation facilities constructed of aluminum. Aluminum is used because its oxide film renders the metal inert to attack by the ammoniacal salt solution. This remedy, however, is a costly one. Other manufacturers employ corrosion inhibitors of one type or another with varying degrees of success.

One type of commonly employed corrosion inhibitor for nitrogen solutions, either alone or in combination with other corrosion inhibitors, is a travalent arsenic compound, for example, arsenic trioxide, an arsenite such as sodium, potassium or ammonium arsenite and sulfides of trivalent arsenic. See, for example, U.S. Patent No. 2,220,059 to Herman A Beckhuis, Jr. et al. and U.S. Patent No. 2,613,131 to Barnes et al. A problem associated with these trivalent arsenic compounds is that they dissolve very slowly when added directly to the ammoniacal solutions of nitrogen compounds. Consequently, the arsenic compounds are preferably first dissolved in an alkaline solution such as an aqueous solution of sodium hydroxide, sodium carbonate, ammonia, etc. Moreover, whether added directly or dissolved in an alkaline solution, it has been found that the solubility of the arsenic compound is inversely proportional to the ammonia/water weight ratio of the nitrogen solutions and that in solutions where this ratio exceeds about 1.5/1 the arsenic compound is not sufficiently soluble to provide adequate protection. Since the nitrogen solution industry supplies large volumes of ammoniacal solutions of nitrogen compounds, solutions that have ammonia/water ratios exceeding about 1.5, there is an ever increasing demand for a trivalent arsenic compound having a greater solubility in such solutions. Attempts to develop more soluble arsenic compounds, however, have heretofore been largely unsuccessful. No inorganic arsenic compounds to our knowledge are sufficiently soluble. In general the organic arsenic compounds are either insoluble or if soluble fail to provide the desired protection.

We have now discovered that complex arsenic compound made by reacting at an elevated temperature gluconic acid, arsenic trioxide and ammonium or an alkali metal hydroxide exhibits unusually high solubility in ammoniacal solutions of nitrogen compounds including those whose ammonia/water ratio exceeds about 1.5 and at the same time provides effective corrosion inhibition. The proportions of the reactants reacted to produce the complex arsenic compound of the present invention are those that will result in a product exhibiting an increased arsenic solubility in ammoniacal solutions. Generally the materials in a ratio of about 1 to 2 mole parts of gluconic acid, about 0.5 to 1.5 mole parts of $As_2O_3$ and about 1.5 to 3 mole parts of ammonium or an alkali metal hydroxide, preferably ammonium, are reacted by heating in the presence of water. Sufficient water to form a suitable reaction medium is employed. The ammonium hydroxide may be provided the reaction mixture by bubbling ammonia gas into the water-containing reaction mixture or it can be added as aqua ammonia. It is preferred to conduct the reaction in the liquid phase at a temperature of at least about 180° F., more preferably about 190 to 210° F. with refluxing. Temperatures above 212° F. may necessitate the use of superatmospheric pressure to maintain the liquid phase.

The quantity of the complex arsenic compound of the present invention added to ammoniacal solutions of nitrogen compounds may vary depending on the particular solution involved. In general the complex arsenic compound is added in an amount of about 0.085 % or more (calculated as $As_2O_3$). The desired protection may be obtained by adding large amounts of the complex arsenic compound although no added advantage is gained by adding the complex compound in excess of the solubility thereof in a particular nitrogen solution employed.

The invention is particularly applicable to solutions of water soluble nitrogen compounds which are employed in the production of fertilizers; for example, aqueous solutions of ammonium salts, such as ammonium nitrate and ammonium chloride, or nitrates such as sodium nitrate; aqueous solutions of the cyanates such as ammonium thiocyanates; aqueous solutions containing ammonium carbonate or carbamate, aqueous solutions containing urea, ammonia and carbon dioxide, etc.

Although our system protects vessels containing solutions of water soluble nitrogen compounds greater need and utility lies in protecting aqueous ammoniacal ammonium nitrate solutions, particularly those in which the ammonia to water ratio by weight is about 1.5 or more. Ammoniacal ammonium nitrate solutions may vary considerably in composition generally representative of such solutions encountered in industry and which give rise to the corrosion problem discussed hereinbefore are those having approximately about 1 to 80 percent ammonium nitrate, usually at least about 40 percent, preferably about 60 to 70 percent, about 5 to 35 percent free ammonia, preferably about 10 to 35 percent and the substantial balance being water, for instance, about 5 to 65 percent water. These percentages are by weight.

The ammonium solutions may include in combination with the complex arsenic compound other inhibitors well known to the art to even further protect ferrous metals. Examples of secondary inhibitors commonly employed are compounds which contain divalent sulfur linked to carbon and preferably linked to an atom of carbon with the remaining valences of the carbon atom linking the carbon to nitrogen and compounds having an SH group and an OH group. Suitable compounds of the first group are dsclosed in U.S. Patent No. 2,220,059 to Herman A. Beckhuis et al. and compounds of the latter group are disclosed in U.S. Patent No. 2,613,131 to Marion D. Barnes et al.

A highly effective inhibitor combination for ammonium nitrate solutions, particularly aqueous ammoniacal ammonium nitrate solutions is that of a trivalent arsenic compound, a soluble copper compound and carbonate ions. This combination in ammonium nitrate solutions produces in situ a "tough" passive film on ferrous metal that is highly resistant to mechanical damage and electrolytic reduction as well as chemical attack. The soluble copper compound can be, for instance, the inorganic compounds such as cupric carbonates, hydroxides, sulfates, nitrates, etc. Of the many carbonate ion-producing compounds, the more particularly suitable are the inorganic compounds for instance, alkali metal and ammonium carbonates. Preferably, the copper and carbonate components are provided by a single compound such as basic copper carbonate. The concentration of the copper and carbonate components can vary considerably but are sufficient to give significant protection against corrosion. Generally, the concentration of the copper component is at least about .01 g. per/100 ml. of ammonium salt solution. The maximum amount of the copper compound is limited only by economic feasibility and is generally not greater than about 0.2 g. per 100 ml. of ammonium salt solution. The preferred concentration is about .05 to .15 g. per 100 ml. of ammoniacal solution. The amount of carbonate compound employed is usually that sufficient to provide a carbonate ion concentration of at least about .005 generally about .02 to .1 g. per 100 ml. of ammonium salt solution. When basic cupric carbonate is employed, a concentration of about .01 to 0.2 g. per 100 ml. of ammonium salt solution, preferably about .05 to .15 is usually sufficient.

It has been noted that the corrosion by ammonium salt solutions is sometimes intense in the vapor zone, i.e., the portion of the vessel containing the solution which is in contact with vapors of the solution. Although trivalent arsenic compounds or combinations of trivalent arsenic compounds with other inhibitors provide corrosion protection to the portion of the vessel in contact with the ammonium salt solutions, adequate protection is not always provided the portion in contact with vapor. This problem can be easily remedied by the addition of vapor phase inhibitors such as urea, $NH_4NO_2$ etc. We have also found that the addition of $NO_2$-producing compounds such as an alkali metal nitrite to the ammoniacal solution containing the soluble copper and carbonate components very effectively reduces vapor phase corrosion and this may be due to the formation of a copper ammonium $NO_2$ complex. The vapor phase inhibitor is generally present in an amount sufficient to provide adequate corrosion protection and conveniently is about 0.05 to 0.5 g. per 100 ml. of ammoniacal solution.

The following examples are included to further illustrate the invention.

EXAMPLE I

A complex arsenic compound was made by mixing together 10.157 g. $As_2O_3$, 10 g. aqua ammonia (28–30% $NH_3$) and 30.01 g. gluconic acid solution (50% in water), heating the mixture to approximately 190° F. and refluxing for one hour. The resulting product was a clear, dark brown liquid having a specific gravity of 1.389 and an arsenic content of 15.96% by weight. The material was tested for solubility in various aqueous ammoniacal ammonium nitrate solution identified in Table I below. For comparison the solubility of $As_2O_3$ ($As_2O_3$ dissolved in 10% NaOH) in the same solutions was determined and is also included in Table I. The results are shown in Table I.

Examination of the data of Table I shows that the complex arsenic compound of the present invention is far more soluble in ammoniacal ammonium nitrate solutions than is $As_2O_3$ (in $NaAsO_2$ form) and that the increase in solubility is present, whether the ammonia/water ratio of the solution is below, at, or above 1.5.

Thus the data clearly demonstrates the solubility advantages of the complex arsenic compound especially in ammoniacal solutions wherein the ammonia/water ratio is about 1.5 or above, for it is in the latter solutions that $As_2O_3$ may not provide an arsenic content of about .05% by weight, ordinarily the arsenic content desired for most effective corrosion protection. Also shown in Table I is the fact that the solubility of $As_2O_3$ in ammoniacal salt solutions is inversely proportional to the ammonia/water ratio.

EXAMPLE II

A complex arsenic compound was prepared by mixing together 30 g. of gluconic acid solution (50% in water), 10 g. of $As_2O_3$ and 2 g. of KOH, heating to 212° F. and refluxing for approximately 1–2 hours. The reaction yielded an aqueous concentrate containing as much as 20% by weight of $As_2O_3$. The product thus prepared was tested for solubility in the ammoniacal solutions of Example I and exhibited solubilities similar to the complex arsenic compound of Example I.

EXAMPLE III

To demonstrate the importance of the gluconic acid in the complex arsenic compound the following tests were conducted:

Compounds similar to gluconic acid, i.e., dextrose, sucrose, corn syrup, tartaric acid, lactic acid and oxalic acid were individually reacted with $As_2O_3$ and KOH in the presence of water as in Example II and the resulting products were tested for solubility in ammoniacal solutions having an $NH_3$/water ratio of about 1.5 and over. None of the products produced were sufficiently soluble, that is, all exhibited an arsenic content (percent As) well below .05.

Example IV

When a piece of active metal is made passive, its position in the electrochemical series is changed so that it is more cathodic to a piece of the same metal which is in the active condition. Since the formation of passive films produces a change in the electrical characteristics of a ferrous metal such as steel, i.e., makes the metal more electropositive, the phenomenon can be effectively studied by observing changes in the single electrode potential of the metal. A series of simple electrolytic cells were set up to achieve this end.

Mild steel coupons, 3″ x ½″ x 1/16″ were first "activated" (i.e., all surface films were removed) by exposure to 15% HCl at 150° F. until hydrogen bubbles were observed. The coupons were then rinsed with deionized water and completely submerged or 50% submerged in 4 ounce bottles containing 100 ml. of ammoniacal solu-

*Table I*

| Soultion No. | 370 | 410A | 410B | 414 [1] | 450 | 471 | 490 |
|---|---|---|---|---|---|---|---|
| Composition: | | | | | | | |
| Free $NH_3$, percent | 16.6 | 22.2 | 26.3 | 19.0 | 25.3 | 30.0 | 34.0 |
| $NH_4NO_3$, percent | 66.8 | 65.0 | 55.5 | 65.6 | 69.2 | 64.0 | 60.0 |
| $H_2O$, percent | 16.6 | 12.8 | 18.2 | 9.4 | 5.5 | 6.0 | 6.0 |
| $NH_3/H_2O$ Ratio | 1 | 1.7 | 1.5 | 1.5 | 4.6 | 5.0 | 5.7 |
| Arsenic Solubility at 40° F.: | | | | | | | |
| $NaAsO_2$ Form, percent As | 0.143 | 0.038 | 0.033 | 0.023 | 0.014 | 0.012 | 0.006 |
| Days before Analysis | 11 | 5 | 15 | 15 | 3 | 5 | 5 |
| Gluconic Acid Form, percent As | 0.32 | 0.336 | 0.292 | 0.338 | 0.310 | | 0.255 |
| Days before Analysis | | 12 | 13 | 12 | 13 | | 12 |

[1] 6% urea.

tions identified in Table I as 370, 410A, 410B, 414, 450 and 490. Each solution contained as inhibitors 0.065% As provided by the complex arsenic compound of Example I together with 0.125% $CuCO_3Cu(OH)_2$ and 0.085% $NaNO_2$. The $NaNO_2$ is a vapor phase corrosion inhibitor and has no effect in the liquid zone. The coupons were exposed to the test solutions for 30 days. In every case the test strips became passive, i.e., remained clean and bright and no corrosion occurred.

The decay of passivity can be observed by recording the decrease in potential when a metal cathodic to the passive steel is brought into electrical contact with it. The potential shift in the more active direction (i.e., more electronegative) is due to the electrolytic reduction of the film by the current that is created by the galvanic couple. When passive steel is activated there is first a steep fall of the potential in the active direction; second, by a less steep change lasting for a fraction of a minute to several minutes; and third, by a steep descent to the active value (i.e., complete breakdown of the passive film; —0.71 to —0.77 volt to calomel for $$NH_3\text{—}NH_4NO_3)$$

The value of the potential immediately preceding this last descent is called the Flade potential.

To determine the resistance to electrolytic destruction of the passive film by the above inhibitors a two inch piece of No. 12 copper wire was physically contacted with the steel coupons immersed in the above ammoniacal solutions and current run for about 30 seconds. This test procedure is far more severe than electrical contact and will ordinarily exceed the Flade potential and destroy passive films. To test the passive films resistance to physical (i.e., abrasion) damage, each coupon was also scratched while immersed in the solutions with a sharp file to form a longitudinal scratch 2′ long on each panel. Ordinarily this would be sufficient to destroy passivity. The scratch coupons were permitted to remain in the solutions for about 14 days. In all the solution tested, no corrosion was evident on the steel coupons demonstrating that the copper carbonate and the gluconic acid-$A_2O_3$—$NH_3$ complex combination produces a highly stable and resistant passive film when introduced in ammoniacal solutions and also is effective in repairing any breaks in the film.

We claim:

1. A composition consisting essentially of an aqueous ammoniacal solution of an ammonium salt having incorporated therein a complex arsenic compound prepared by reacting at an elevated temperature in an aqueous medium 1 to 2 mole parts of arsenic trioxide, about .5 to 1.5 mole parts of gluconic acid, and about 1.5 to 3 mole parts of a compound selected from the group consisting of ammonium and alkali metal hydroxides, said complex arsenic compound being present in an amount sufficient to decrease the rate of corrosion of ferrous metal by said solution.

2. The composition of claim 1 in which the solution is ammoniacal ammonium nitrate.

3. The composition of claim 2 in which the ratio of ammonia to water exceeds about 1.5.

4. A composition consisting essentially of an aqueous ammoniacal ammonium nitrate solution, a complex arsenic compound prepared by reacting at an elevated temperature in an aqueous medium 1 to 2 mole parts of arsenic trioxide, about .5 to 1.5 mole parts of gluconic acid, and about 1.5 to 3 mole parts of a compound selected from the group consisting of ammonium and alkali metal hydroxides, a soluble inorganic copper compound and carbonate ions obtained from a carbonate ion-producing inorganic carbonate, the amounts of said compounds and said ions being sufficient to substantially reduce the rate of corrosion of ferrous metal by said solution.

References Cited in the file of this patent

UNITED STATES PATENTS

| | | |
|---|---|---|
| 2,220,059 | Beekhuis et al. | Nov. 5, 1940 |
| 2,566,382 | Sweet et al. | Sept. 4, 1951 |
| 2,644,005 | Urbschat | June 30, 1953 |
| 2,794,299 | Thomas | June 4, 1957 |
| 2,913,406 | Hoover | Nov. 17, 1959 |
| 2,957,762 | Young | Oct. 25, 1960 |
| 3,033,670 | Stanford et al. | May 8, 1962 |

OTHER REFERENCES

The Evening Star, Washington, D.C., May 21, 1958, p. A-39.